United States Patent [19]

Reichert et al.

[11] Patent Number: 4,705,648
[45] Date of Patent: Nov. 10, 1987

[54] THERMALLY CONDUCTING, ELECTRICALLY INSULATING THERMOPLASTICS

[75] Inventors: Karl-Heinz Reichert, Berlin; Wolfgang Schoeppel, Norderstedt; Stawros Ewangelidis, Berlin; Jürgen Bednarz, Penzberg; Ulrich Leute, Zorneding, all of Fed. Rep. of Germany

[73] Assignee: Siemens Aktiengesellschaft, Berlin and Munich, Fed. Rep. of Germany

[21] Appl. No.: 741,351

[22] Filed: Jun. 5, 1985

[30] Foreign Application Priority Data

Jun. 6, 1984 [DE] Fed. Rep. of Germany ....... 3421105

[51] Int. Cl.$^4$ .............................................. H01B 1/06
[52] U.S. Cl. .................................. 252/512; 526/167; 524/439; 524/441; 524/500; 252/518
[58] Field of Search ................ 252/512, 518; 526/167; 523/211; 524/439, 500, 441; 264/331.11, 331.13; 428/35, 43, 323, 327, 328, 330

[56] References Cited

U.S. PATENT DOCUMENTS 3,300,329  1/1967  Orsino et al. ..................... 427/216
4,564,647  1/1986  Hayashi et al. ................... 523/216

OTHER PUBLICATIONS

Makromol. Chem., Rapid Commun, 3, 1982 S. 483–488.
Messe-Information Hannover 83, Institut fur Technische Chemie der Technischen Universitat Berlin: Blasensaule als Polymerisations-Reaktor, Polymer/Metall-Werkstoffe.

Primary Examiner—Josephine L. Barr
Attorney, Agent, or Firm—Hill, Van Santen, Steadman & Simpson

[57] ABSTRACT

The production of thermoplastics by polymerization of olefins in the presence of light metal non-ferrous metal or alloys thereof by means of a heterogenous Ziegler-Natta catalyst is taught. Preferably, the polyolefin is crosslinked in regions thereof adjacent the metal particles. The product resins can be employed either alone or as a component of a polyblend with other polymers for the purpose of achieving heat removal with simultaneous electrical insulation in electronic and electrical engineering applications.

17 Claims, No Drawings

THERMALLY CONDUCTING, ELECTRICALLY INSULATING THERMOPLASTICS

BACKGROUND OF THE INVENTION

1. Field of the Invention

This invention lies in the field of thermally conductive, electrically insulative thermoplastic resins and processes for making the same.

2. Prior Art

In electronic and electrical components and apparatus, due to increasing integration, and packing density, problems with heat removal through plastic envelopes occur. Such problems are found in individual integrated circuits where the heat produced during chip operation must be dissipated (abducted or removed) through the encapsulation means therefor, such as, for examples, encased hybrid circuits, housings of thermally highly loaded apparatus, and the like. An electrically insulating plastic having good heat (thermal) conducting properties is always desired. Such a property combination is also required in other fields of electrical engineering; for example, in small motors.

The thermal conductivity of unfilled, non-foamed plastics lies between approximately 0.2 and 0.5 $Wm^{-1}K^{-1}$.

In the case of thermosetting plastic molding or sealing compounds, through the addition thereto of approximately 70% quartz, thermal conductivity values of up to about 2 $Wm^{-1}K^{-1}$ are obtained. With thermoplastic polymers which are characteristically electrically non-conducting (i.e., insulative), but thermally conducting, as a rule, very hard, particulate fillers with good thermal conductance characteristics are seldom employed, since thereby considerable processing problems (abrasion) occur.

If the electrically insulative property is relinquished, however, thermoplastics can be obtained which, as a consequence of their filler (such as aluminum flakes or the like) exhibit a strongly anisotropic thermal conductivity of about 2 $Wm^{-1}K^{-1}$ or somewhat more.

It is known that ethylene can be polymerized in the presence of iron powder in such a fashion that the individual iron particles are covered with a polymer layer (Fair-information, Hannover 82, Institute for Technical Chemistry of the Technical University, Berlin: Blasensaule als Polymerisations-Reaktor, Polymer/Metall-Werkstoffe). Although this product shows a markedly higher specific electrical volume resistance than a comparable physical mixture of polyethylene containing the same volume-proportion of iron, this resistance is too small for utilization as an electrical insulation medium compared to the iron contents which lead to the commercially desired values of thermal conductivity.

BRIEF SUMMARY OF THE INVENTION

More particularly, the present invention is directed to polymer compositions produced by polymerizing monomers in the presence of dispersed light metal particles.

Such product polymer compositions surprisingly have improved thermal conductivity and electrical resistance characteristics compared to the corresponding polymers prepared in the absence of such light metal particles, and also compared to the corresponding polymer compositions prepared by the sequence of first polymerizing and then blending such light metal particles into the product polymer.

In addition, such product polymer compositions surprisingly have higher specific electrical volume resistance characteristics than corresponding (comparable) polymer compositions of the prior art made with iron particles.

The present invention further provides methods for making and using such metal particles containing polymer compositions.

In addition, the present invention also provides new articles of manufacture in the form of extruded profiles formed from or containing or comprising such metal particles containing polymer compositions.

A principle object underlying the present invention concerns the production of thermoplastic polymer compositions containing light metal particles which compositions have properties which also exhibits at least a minimum level of commercially acceptable insulation properties.

Other and further aims, objects, purposes, advantages, uses, and the like for the present invention will be apparent to those skilled in the art from the present specification.

DETAILED DESCRIPTION

The term "light metal" is used herein in its conventional meaning and has reference to a metal or metal alloy of specific gravity less than about 3 that is strong and stable enough for construction use (aluminum, magnesium, beryllium or alloys of these metals). Aluminum and its alloys is preferred for use in the present invention. In contrast, iron, for example, has a specific gravity of 7.87.

The light metal employed as a starting material is in the form of a powder. Presently preferred average particle sizes fall in the range from about 1 to 100 micrometers ($\mu$m) or microns ($\mu$) and preferably in the range from about 20 to 80 microns.

For the expert, it was not at all obvious to employ, instead of iron, light metals, in polyolefins.

Thus, it is known, for example, that aluminum in air forms a thin passivating $Al_2O_3$ layer on its exposed surface portions. In order to prevent this, the surfaces of aluminum products of many manufacturers are provided with very thin layers of organic coatings or inorganic alloys. These layers, as well as the light metals and non-ferrous metals themselves, in combination with parts of the catalyst system, can bring about a plurality of undesired reactions during polymerization which can have adverse consequences, such as de-activation of the catalyst. It was, therefore, surprising that, in contrast to largely oxide-free aluminum flakes (for example, type K 102 HE, available from Omya GmhH), polymerization in the presence of surface-oxidized aluminum powder (for example, type Ecka AS 081, available from Eckart-Werke) led to products with exceptionally good thermal conductivity and electrical insulation properties.

The light metal particles are incorporated into a polymer as it is being polymerized, in accord with the present invention. The exact amount used can vary, but it is presently preferred to employ a quantity which will produce a product polymer composition having uniformly dispersed therethrough sufficient of such metal particles to produce a volume percent ranging from about 25 to 85, and preferably from about 35 to 70 vol. %, with the balance up to 100 vol. % being in situ polymerized polymer.

The light metal particles can be surface oxidized or not, as desired; however, it is presently preferred to employ surface oxidized metal particles, especially surface oxidized aluminum powder.

The shape of the individual light metal particles can vary. For examples, the particles can be in the form of flakes, spheres, fibers, or the like.

Those skilled in the art will appreciate that the principles of the present invention can be practiced with various polymers so that a light metal powder can be dispersed and incorporated into the polymer at the time of its polymerization in order to produce product resins having improved thermal conductivity and electrical insulation characteristics. However, it is presently preferred to employ in the practice of the present invention polyolefins.

The term "polyolefin" is used herein in its conventional meaning and has reference to a class of thermoplastic polymers derived by polymerization from simple olefins. Among the more important are polyethylene, polypropylene, polybutenes, polyisoprene, and their copolymers.

Polyethylene is presently most preferred for use in the present invention.

In the present invention, the polyolefins are produced in polymerizing olefins with catalysts.

Examples are Ziegler-Natta catalysts. There are many catalysts of this general type which are adapted for the production of polyethylene, polypropylene, or other polyolefins in accord with the present invention.

The term "Ziegler-Natta catalyst" is used herein in its conventional meaning and has reference to a type of stereospecific catalyst, usually a chemical complex derived from a transition metal halide and a metal hydride or a metal alkyl. The transition metal may be any of those in groups IV to VIII of the periodic table; the hydride or alkyl metals are those of groups I, II, and III. Typically, titanium chloride is added to aluminum alkyl in a hydrocarbon solvent to form a dispersion or precipitate of the catalyst complex. These catalysts usually operate at atmospheric pressure and are used to convert ethylene to linear polyethylene, and also in stereospecific polymerization of propylene to crystalline polypropylene (Ziegler process).

Except for the addition of, and presence of, light metal powder in a starting olefinic polymerizable system, conventional olefin polymerization techniques utilizing stereospecific catalysts are generally employable in the practice of this invention which in and of itself can be considered to be advantageous. It is presently much preferred that such catalysts as employed be very active.

For example, a high-density (linear) polyethylene is produced when ethylene is polymerized by Ziegler-Natta catalysts at from about 1 to 100 atm (15 to 1500 psi) and at from room temperature to about 200° F. Batch polymerization using initially liquid phase suspension conditions are preferred for use in the present invention. The reactants, metal particles and catalyst may be, and preferably are suspended in a substantially inert liquid medium at the time when polymerization is initiated and carried out. Suitable such media are known to the prior art and include hydrocarbons such as diesel oil and the like.

Ethylene may be copolymerized with varying percentages of other monomers in the presence of such light metal particles. When a diene such as butadiene is added to the copolymer blend, a vulcanizable elastomer is obtained, as is known.

When added to an olefin suspension to be polymerized in the presence of a stereospecific catalyst, various multifunctional monomers can be used to induce a controlled crosslinking in the polymerizing polyolefin, as is known.

Presently preferred alkadienes for use in the present invention can contain from about 6 to 14 carbon atoms per molecule. Mixtures of alkadienes can be employed.

In the case of the present invention, when a crosslinking effect is desired, dienes comprise a preferred class of multifunctional monomeric additives to a starting suspension. The presently preferred quantity so added ranges from 0 up to about 10 mole percent of the total amount of lower alkene monomer present initially. Batch polymerization is presently preferred. The term "lower" as used herein in reference to alkene monomer indicates that such a monomer contains from 2 through 5 carbon atoms.

Evidently, olefinic polymerization tends to occur in and around surface portions of the light metal particles present in a polymerizing mass. When one or more members of such a preferred additive class are present, the polymeric layer developing about such particles then tends to be selectively crosslinked in the immediate vicinity of these particles in comparison to the polymer mass produced in the polymer found in regions thereof relatively removed or spaced from such particles, as those skilled in the art will appreciate. Such a crosslinking effect is believed to enhance the desired combination of thermal conductivity and electrical resistance associated with polymer compositions of this invention, particularly as regards electrical resistance characteristics.

For example, the utilization of substantially spherically shaped and relatively soft aluminum powder particles in polyolefins, prepared as taught by this invention, is found to improve the thermal conductivity and the electrical insulation capacity. However, it is found that the electrical insulation capacity is increased, in accordance with a further development of the invention, when the polyolefin, which has been grown (i.e. polymerized) on the surface of the light metal powder particles, is crosslinked at least in regions adjacent to the metal particles. Also, plastics which contain (or are filled) with such so coated metal particles exhibit a relatively low bulk density, which is desirable in many applications.

Polyolefins characteristically are known not to be very flame resistant and characteristically are known not to be sufficiently heat-resistant for many applications, and the addition thereto of flame-retarding substances in effective concentrations evidently reduces the electrical resistance thereof. However, in accordance with a further development of the present invention, after the polymerization in the presence of light, one or more known polymers is polyblended with the resulting product resin. Such known polymers are preferably selected so as to be themselves non-combustible (flame resistant) as well as being more heat resistant than polyolefins. For example, polyphenylene sulfide is a presently preferred such polyblendable polymer.

The term "polyblend" is used herein in its conventional meaning and has reference to a combination in any proportion of, for examples, (1) two homopolymers, (2) a homopolymer and a copolymer, or (3) two copolymers. An example of (1) comprises two polyethylene polymers, one of which is a polyethylene homopolymer composition of this invention containing dispersed therein light metal particles and produced as herein described. An example of (2) comprises such a polyethylene polymer composition of this invention and a polyolefin comprised of ethylene and propylene. An example of (3) comprises a polyethylene copolymer composition of this invention containing dispersed therein light metal particles and produced as herein described by incorporating into the starting polymerizable system at least one diene containing from about 6 to 10 carbon atoms per molecule and isobutylene-isoprene copolymer. More than two different polymers may be present. Thus, a polyblend is a mixture that is made after its components have been polymerized, and thus is different from a copolymer which is made by chemical combination of two monomers.

Thermoplastic compositions of this invention are particularly suitable for use in all fields of electronics and electrical engineering where heat is to be abducted. Although the thermal conductivity characteristics of pure metals, such as are achieved, for example, in the case of aluminum cooling castings, are not achieved with these compositions, these compositions do make it possible to dispense with additional measures for achieving electrical insulation (such as is done in the prior art, for example, with plastic foils) such plastic foils, as a rule, represent large thermal resistance values, and, thus, tend to make heat removal considerably more difficult to accomplish at the rates needed for effectiveness than is accomplishable with such compositions of this invention.

The product of an olefin polymerization in the presence of light metal powder particles as herein described is typically in the form of a powder. Preferably, such is washed with an organic solvent, such as acetone, or the like, to remove diluents residuals and the like, after which such product can be conventionally processed as a thermoplastic. Thus, the product can comprise the principle polymer composition of a plastic covering or envelope employed about electronic or electric components, of the like, as desired. Alternatively, and as indicated above, the product can be polyblended with other polymers before being utilized as such a plastic covering, or the like, as desired.

The exact volume percent content of light metal particles distributed in, for example, a polyolefin product resin composition can vary considerably, depending upon the particular combination of properties desired such as a particular combination of thermal conductivity and electrical resistance.

Polyethylene product resins containing aluminum particles and having a thermal conductivity of at least about 2 $Wm^{-1}K^{-1}$ are presently preferred, and to achieve such a characteristic in such a product, it appears to be necessary to incorporate thereinto at least about 40 vol. % of aluminum particles. Up to about 85 vol. % of such particles can be present. The specific electrical resistance of such a product with such an aluminum content appears to be characteristically above about $3 \times 10^9$ Ohm-meters. The aluminum particles have their surfaces oxidized and are in the physical form of flakes having average particle sizes in the range from about 20 to 80 microns. The starting monomer composition is comprised of from about 90 to 98 mole percent of ethylene and correspondingly from about 10 to 2 mole percent of at least one alkadiene containing from about 6 to 14 carbon atoms per molecule. Polymerization is conducted using a Ziegler-Natta catalyst. The monomer composition, the aluminum particles, and the catalyst are initially dispersed in an inert liquid, such as a hydrocarbon.

The metal particles containing thermoplastic polymer compositions of this invention and polyblends containing the same can be extruded into profiles by conventional procedures and equipment. Examples of suitable profiles include sheets (including films) and tubes.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

EXAMPLE 1

Polymerization of ethylene in the presence of aluminum powder.

174.2 g untreated aluminum powder (type Ecka AS 081, available from Eckart-Werke in West Germany; d=5–45 $\mu$m) and 1.4 liters water-free diesel oil of the Esso Firm (Exsol D 140/170) are put into a 2-liter-autoclave of rust-free steel in a nitrogen atmosphere. The suspension is heated to 80° C., compounded with 0.651 g $TiCl_4$, and subsequently saturated with ethylene. To this suspension is added 14.7 g 1,7-octadiene and 3.9 g of a carrier-fixed Ziegler catalyst. This catalyst is produced in a known fashion through the grinding of Mg $(OEt)_2$ and the subsequent reaction thereof with titanium tetrachloride [$TiCl_4$] and aluminum isobutylate [Al(i-Bu)$_3$] (1. DE 1 795 197, Diedrich, Keil/Hoechst; and 2. Polymer 19, Nr. 5 (1978), L. L. Bohm). The polymerization proceeds at 80° C., a total pressure of 1.6 bar and an agitator speed of 1100 rpm. After a polymerization period of two hours, a powdery product is obtained which, after washing with acetone and drying at 60° C., in a vacuum weight 206 g. This corresponds to an aluminum content of 65 Vol. %.

Samples of various polyethylene resins are produced which contain various volume percentages of aluminum powder. It is found that the specific electrical volume resistance measured according to DIN 53482 is always above about $3 \times 10^9$ Ohm.m. Thus, the resins so produced are found to be useful as electrical insulators.

The dependency of the thermal conductivity of these samples on the volume-proportion of aluminum contained therein is determined by using the following diagram: On the ordinate, the thermal conductivity is plotted, which on the abscissa, the volume-proportion of aluminum is plotted.

In order to achieve a preferred thermal conductivity of at least about 2 $Wm^{-1}K^{-1}$, a volume-proportion of at least about 40% aluminum appears to be needed.

The thermal dimensional stability of the inventive thermoplastic resins is determined according to the Vicat (DIN 53460) and such is found to be considerably higher than is the case with pure polyethylene. For example, for a product polyethylene resin containing a volume proportion of 75% aluminum, at the Vicat-temperature VST/B/50, a value of 147° C. is measured.

EXAMPLE 2

The procedure of Example 1 is repeated except that no 1,7-octadiene is added to the polymerization suspension.

The electrical volume resistance and the thermal stability of the product resins produced is found to be improved over pure polyethylene alone or polyethylene containing equivalent volume percentages of aluminum prepared by compounding previously polymerized polyethylene with the same pure aluminum powder (which has not been previously treated to polymerization in the presence of ethylene). However, the product resins produced have thermal conductivities and electrical volume resistances which are less than the corresponding values associated with the resin products produced by the procedure of Example 1 above.

EXAMPLE 3

When each of the metal particles containing resin compositions of Examples 1 and 2 is extruded, it is found that such compositions are well suited for making extruded profiles, such as sheets and tubes.

EXAMPLE 4

When each of the metal particles containing resin compositions of Examples 1 and 2 is polyblended with polyphenylene sulfide, it is found that heat resistant blends result having excellent thermal conductivity and electrical insulation capacity.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim:

1. An electrically insulating, thermally conductive polyolefin resin composition containing from about 25 to 85 volume percent of light metal particles dispersed therethrough on a 100 volume percent total resin composition basis, said polyolefin resin having been produced by polymerizing a composition comprising
   (a) at least one compatible lower alkene monomer selected from the group ethylene, propylene, and butene,
   (b) an alkadiene as a crosslinking monomer having from about 6 to 14 carbon atoms,
   (c) a Ziegler-Natta catalyst, and
   (d) light metal particles comprising a metal selected from the group aluminum, magnesium, beryllium, and alloys thereof with said particles having oxidized surfaces and being dispersed in the liquid phase of said monomer composition, said light metal of said particles being characterized by having a specific gravity of less than about 3, said particles being characterized by having a particle size in the range from about 1 to 100 microns said particles comprising from about 25 to 85 volume percent of said resin composition.

2. The resin composition of claim 1 wherein said light metal is selected from the group consisting of aluminum magnesium and beryllium or alloys thereof.

3. The resin composition of claim 1 wherein said polyolefin comprises polyethylene and said olefin monomer composition comprises ethylene.

4. The resin composition of claim 3 wherein said polyolefin is crosslinked in regions thereof immediately adjacent such metal particles.

5. The resin composition of claim 4 wherein said light metal comprises aluminum.

6. The resin composition of claim 1 wherein said light metal particles have oxidized surfaces.

7. The resin composition of claim 1 wherein said light metal particles comprise from about 35 to 70 volume percent of the total said resin composition.

8. A polyblend comprising a polyolefin resin composition of claim 1 and a polyphenylene sulfide polymer.

9. An extruded profile comprised of a resin composition of claim 1.

10. The composition of claim 9 wherein said profile comprises a sheet.

11. The composition of claim 9 wherein said profile comprises a tube.

12. In a process for making a polyolefin resin having electrically insulating, thermally conductive properties of the type where a lower alkene monomer composition is the type where a lower alkene monomer composition of at least one monomer selected from the group ethylene, propylene, and butene is polymerized in the liquid phase in the presence of a Ziegler-Natta catalyst with light metal particles being dispersed in such monomer composition, said light metal particles comprising from about 25 to 85 volume percent of the final polymerized resin, said light metal particles being selected from the group consisting of aluminum, magnesium, and beryllium, said monomer composition additionally containing initially up to about 10 mole percent of an alkadiene having from about 6 to 14 carbon atoms per molecule based on total lower alkene monomer initially present, said light metal particles being further characterized by having oxidized surfaces, particle sizes in the range from about 1 to 100 microns, and specific gravities less than about 3.

13. The process of claim 12 wherein said light metal particles comprise from about 35 to 70 volume percent of the final polymerized resin.

14. The process of claim 12 wherein said monomer composition with said light metal particles dispersed therein is in a liquid phase when said polymerization is initiated.

15. A thermoplastic polyethylene resin composition having a thermal conductivity of at least about 2 $Wm^{-1}K^{-1}$ and a specific electrical resistance of at least about $3 \times 10^9$ Ohm-meters, said resin composition having dispersed therethrough from about 40 to 85 weight percent of aluminum particles having average particle sizes in the range from about 20 to 80 microns, said particles being in the physical form of flakes and having the surfaces of such particles oxidized, said resin composition having been produced by polymerizing a monomer composition comprised of from about 90 to 98 mole percent of ethylene and correspondingly from about 10 to 2 mole percent of at least one alkadiene containing from about 6 to 14 carbon atoms per molecule in the presence of a Ziegler-Natta catalyst and aluminum particles, said monomer composition, said catalyst and said aluminum particles being initially dispersed in an inert liquid.

16. The resin composition of claim 1 wherein said alkadiene comprises 1, 7 octadiene.

17. The process of claim 12 wherein said alkadiene comprises 1, 7 octadiene.

* * * * *